US011976771B2

(12) United States Patent
Al-Harbi et al.

(10) Patent No.: US 11,976,771 B2
(45) Date of Patent: May 7, 2024

(54) SEALING PIG LAUNCHER DOORS

(71) Applicant: Saudi Arabian Oil Company, Dhahran (SA)

(72) Inventors: Mousa R. Al-Harbi, Dammam (SA); Khaled A. Al-Odaib, Dammam (SA); Essam Ahmed Al-Arfaj, Al Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 392 days.

(21) Appl. No.: 17/493,925

(22) Filed: Oct. 5, 2021

(65) Prior Publication Data

US 2023/0104657 A1 Apr. 6, 2023

(51) Int. Cl.
*F16L 55/46* (2006.01)

(52) U.S. Cl.
CPC .................................... *F16L 55/46* (2013.01)

(58) Field of Classification Search
CPC ..................................................... F16L 554/46
See application file for complete search history.

(56) References Cited

U.S. PATENT DOCUMENTS 2,707,575 A 5/1955 Thomas
2,929,531 A * 3/1960 Kohlins ..................... B01J 3/03 277/921
3,548,881 A 12/1970 Pavan
3,672,403 A 6/1972 Wilson et al.
4,014,367 A 3/1977 Milo
4,237,936 A 12/1980 Lollis et al.
4,976,144 A 12/1990 Fitzgerald
5,197,328 A 3/1993 Fitzgerald
5,272,647 A 12/1993 Hayes
5,329,465 A 7/1994 Arcella et al.
5,433,334 A * 7/1995 Reneau ..................... E05C 5/00 220/319
5,549,137 A 8/1996 Lenz et al.
(Continued)

FOREIGN PATENT DOCUMENTS

EP 0315391 4/1994
WO WO 2015020986 2/2015
WO WO 2015153106 10/2015

OTHER PUBLICATIONS

SAIP Examination Report in Saudi Arabian Appln. No. 122440326, dated Oct. 30, 2023, 11 pages with English translation.

*Primary Examiner* — Kevin R Barss
(74) *Attorney, Agent, or Firm* — Fish & Richardson P.C.

(57) ABSTRACT

A pressure vessel defines an opening with a shoulder around a periphery of the opening. A door is configured to regulate access to the opening. The door is configured to compress against the shoulder when in the closed position. A first seal is between the door and the shoulder. The first seal touches an interior side of the door and the shoulder when the door is in the closed position. The first seal is configured to seal fluid within the pressure vessel. A second, active seal surrounds a periphery of the opening. The seal is actuable between an engaged position and a disengaged position regardless of a position of the door. The second, active seal touches the periphery of the door, perpendicular to the first seal, when in the engaged position and the door is in the closed position. The second, active seal is configured to seal fluid within the pressure vessel.

20 Claims, 8 Drawing Sheets

(56) References Cited

U.S. PATENT DOCUMENTS

| | | | | |
|---|---|---|---|---|
| 5,748,469 | A | 5/1998 | Pyotsia | |
| 6,029,977 | A | 2/2000 | Sym | |
| 6,131,609 | A | 10/2000 | Metso et al. | |
| 6,485,029 | B1 | 11/2002 | Moody et al. | |
| 7,940,189 | B2 | 5/2011 | Brown | |
| 8,768,631 | B2 | 7/2014 | Wilke | |
| 8,838,413 | B2 | 9/2014 | Genta | |
| 8,850,880 | B2 | 10/2014 | Püttmer | |
| 10,317,718 | B2 | 6/2019 | Ihalainen et al. | |
| 10,344,782 | B2 | 7/2019 | Penning et al. | |
| 10,429,427 | B2 | 10/2019 | Fink et al. | |
| 2002/0017521 | A1* | 2/2002 | Farmer | B65D 43/14 220/252 |
| 2004/0056031 | A1 | 3/2004 | McGuire | |
| 2008/0257888 | A1* | 10/2008 | Lee | B01J 19/28 220/324 |
| 2011/0192848 | A1* | 8/2011 | Lollis | F16J 13/08 220/315 |
| 2012/0000055 | A1 | 1/2012 | Guidry | |
| 2012/0234834 | A1* | 9/2012 | Akhund | F16J 13/20 220/324 |
| 2013/0110418 | A1 | 5/2013 | Nousiainen | |
| 2014/0259950 | A1* | 9/2014 | Thompson | B64C 1/1461 49/466 |
| 2018/0163874 | A1* | 6/2018 | Euwer | F16K 1/205 |
| 2023/0338319 | A1* | 10/2023 | Lewis | A61P 11/00 |
| 2023/0341231 | A1* | 10/2023 | Fox | G01C 21/3476 |

* cited by examiner

Activated Position

SEALING PIG LAUNCHER DOORS

TECHNICAL FIELD

This disclosure relates to pressure doors on pressure vessels.

BACKGROUND

Various pressure vessels in processing facilities, such as pig launchers, include access hatches to access an interior of the pressure vessels. Various sealing and hatch systems are used for each vessel depending upon the pressure rating, access size requirements, and access frequency requirements. For example, a pig launcher requires more frequent access than a typical fluid separator to allow for pigging operations. Pigging operations involve loading a pig (essentially a flowable plug that scrapes the sides of a fluid conduit) into a pig launcher, sealing the pig launcher, pressurizing the pig launcher, and flowing the pig from the pig launcher, through the conduit, to a pig receiver. The pig receiver is then depressurized and the pig is removed from the pig receiver. In some circumstances, the pig launcher and the pig receiver can be the same vessel. In general, it is safest to keep pressure and fluid within the pressure vessels and to prevent leaks to the outside environment.

SUMMARY

This disclosure describes technologies relating to sealing pig launcher doors.

An example of the subject matter described within this disclosure is an access way to a pressure vessel. The access way includes the following features. A pressure vessel defines an opening with a shoulder around a periphery of the opening. A door is actuable between an open and a closed position. The door is configured to regulate access to the opening. The door is configured to compress against the shoulder when in the closed position. A first seal is between the door and the shoulder. The first seal is attached to the door or the shoulder. The first seal touches an interior side of the door and the shoulder when the door is in the closed position. The first seal is configured to seal fluid within the pressure vessel. A second, active seal surrounds a periphery of the opening. The seal is actuable between an engaged position and a disengaged position regardless of a position of the door. The second, active seal touches the periphery of the door, perpendicular to the first seal, when in the engaged position and the door is in the closed position. The second, active seal is configured to seal fluid within the pressure vessel.

Aspects of the example access way, which can be combined with the example access way alone or in combination with other aspects, include the following. A hydraulic or pneumatic connection is configured to fluidically connect the second, active seal and a pneumatic or hydraulic pressure source. The pressure source is configured to actuate the second, active seal.

Aspects of the example access way, which can be combined with the example access way alone or in combination with other aspects, include the following. The second, active seal includes a flexible membrane configured to be filled by the pneumatic or hydraulic fluid. The pneumatic or hydraulic fluid actuates the second, active seal between an engaged and disengaged position. The engaged position is when the flexible membrane is filled with the pneumatic or hydraulic fluid. The disengaged position is when fluid is removed from flexible membrane.

Aspects of the example access way, which can be combined with the example access way alone or in combination with other aspects, include the following. The second, active seal includes a bias arranged to maintain the second, active seal in a disengaged position. The hydraulic or pneumatic fluid is configured to overcome the bias to actuate the second, active seal from the disengaged position to the engaged position.

Aspects of the example access way, which can be combined with the example access way alone or in combination with other aspects, include the following. The bias includes a metal spring.

Aspects of the example access way, which can be combined with the example access way alone or in combination with other aspects, include the following. A recess is defined by the pressure vessel. The recess encircles the periphery of the door when the door is in the closed position. The recess retains the second, active seal when the second, active seal is in the disengaged position.

Aspects of the example access way, which can be combined with the example access way alone or in combination with other aspects, include the following. The second, active seal includes a cross-sectional profile that includes a base abutting the bias and a contact extending from the base towards a periphery of the opening.

An example of the subject matter described within this disclosure is a method with the following features. A pig is received by a pig launcher. A door of the pig launcher is received by a door seat of the pig launcher. The door is received in a closed position. A first seal of the pig launcher is engaged to retain pressure within the pig launcher responsive to receiving the closed door. The closed door touches the first seal. A second, active seal around a periphery of the pig launcher door is engaged to retain pressure within the pig launcher responsive to a pressure signal.

Aspects of the example method, which can be combined with the example method alone or in combination with other aspects, include the following. Engaging the first seal includes compressing the first seal against a side of the door that abuts the pig launcher.

Aspects of the example method, which can be combined with the example method alone or in combination with other aspects, include the following. Engaging the second, active seal includes applying hydraulic or pneumatic fluid to the second, active seal.

Aspects of the example method, which can be combined with the example method alone or in combination with other aspects, include the following. Engaging the second, active seal includes abutting the second, active seal around a periphery of the door.

Aspects of the example method, which can be combined with the example method alone or in combination with other aspects, include the following. Fluid is flowed from the pig launcher past the first seal. Fluid flow from the pig launcher is ceased by the second, active seal.

Aspects of the example method, which can be combined with the example method alone or in combination with other aspects, include the following. The second, active seal is disengaged. The door is released by the pig launcher.

Aspects of the example method, which can be combined with the example method alone or in combination with other aspects, include the following. Disengaging includes biasing the second, active seal away from the door. Pressurized fluid is released from the second, active seal.

An example of the subject matter described within this disclosure is a pig launcher with the following features. A pressure retaining wall defines a cavity, an inlet to the cavity, and an outlet to the cavity. A door is actuable between an open and a closed position. The door is arranged to define a portion of the cavity when in the closed position. The door is configured to seat against the inlet to the cavity. The door is configured to regulate access to the cavity. A first seal is between the door and the pressure retaining wall. The first seal is parallel to the door when the door is in the closed position. The seal touches the door when the door is in the close position. The first seal is configured to seal fluid within the pig launcher. A second, active seal surrounds a periphery of the inlet to the cavity. The second, active is actuable between an engaged position and a disengaged position. The second, active seal touches the periphery of the door when in the engaged position and the door is in the closed position. The second, active seal is configured to seal fluid within the pig launcher.

Aspects of the example pig launcher, which can be combines with the example pig launcher alone or in combination with other aspects, include the following. A hydraulic or pneumatic pressure source is configured to actuate the second, active seal.

Aspects of the example pig launcher, which can be combines with the example pig launcher alone or in combination with other aspects, include the following. The second, active seal comprises a flexible membrane configured to be filled by a pneumatic or hydraulic fluid supplied by the hydraulic or pneumatic pressure source. The pneumatic or hydraulic fluid actuates the second, active seal between an engaged and disengaged position. The engaged position is when the flexible membrane is filled with the pneumatic or hydraulic fluid. The disengaged position is when fluid is removed from flexible membrane.

Aspects of the example pig launcher, which can be combines with the example pig launcher alone or in combination with other aspects, include the following. The second, active seal includes a bias arranged to maintain the second, active seal in a disengaged position.

Aspects of the example pig launcher, which can be combines with the example pig launcher alone or in combination with other aspects, include the following. The bias includes a metal spring.

Aspects of the example pig launcher, which can be combines with the example pig launcher alone or in combination with other aspects, include the following. The pressure retaining wall further defines a recess that retains the second, active seal when in the second, active seal is in the disengaged position.

Particular implementations of the subject matter described in this disclosure can be implemented so as to realize one or more of the following advantages. Aspects of the subject matter described herein provide additional safety to workers during pig launching and receiving operations. Alternatively or in addition, the subject matter described herein benefits the environment by eliminating leaks to the outside environment in case the primary seal is damaged.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

As pig launchers and receivers are frequently accessed, that is, the access hatch is opened and closed, access hatch seals can wear at a faster rate than similarly rated pressure vessels. As such, launching and receiving pigs are often considered one of the more hazardous operations at most processing facilities. In a typical pig launcher, a single seal is located between the door and a seat of the door, such as a shoulder defined by the pressure vessel. Such a seal can be integrated into the shoulder or the door itself. The door itself is typically held pressure tight by some form of a compression latch that compresses the seal between the door and the seat. High compression is common to ensure a pressure tight seal, but there is still a single seal between a high-pressure environment and an external environment, and this seal is frequently unseated and deformed by compressive forces. As such, this primary seal is prone to failure.

This disclosure relates to clamping an auxiliary seal around the periphery of a pig launcher or receiver hatch. The auxiliary seal is activatable from a retracted position to a sealing position. When the hatch is open or moving, the seal is retracted into a housing surrounding the periphery of the hatch. The auxiliary seal includes an inflatable, spring loaded elastomer that is hydraulically or pneumatically filled to actuate the auxiliary seal.

Figure 1:
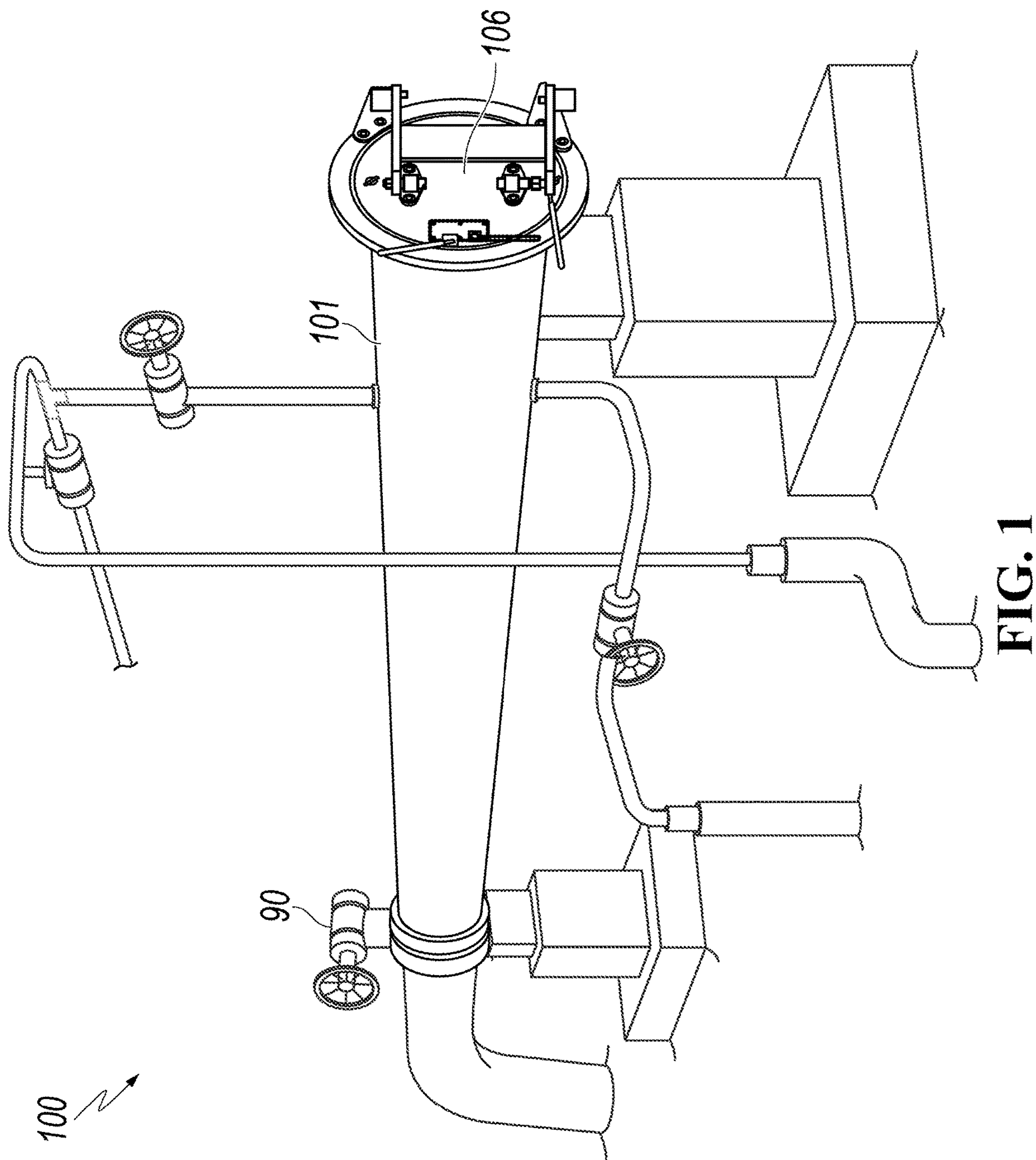
FIG. 1 is a perspective view of an example pig launcher and receiver.
Figure 2:
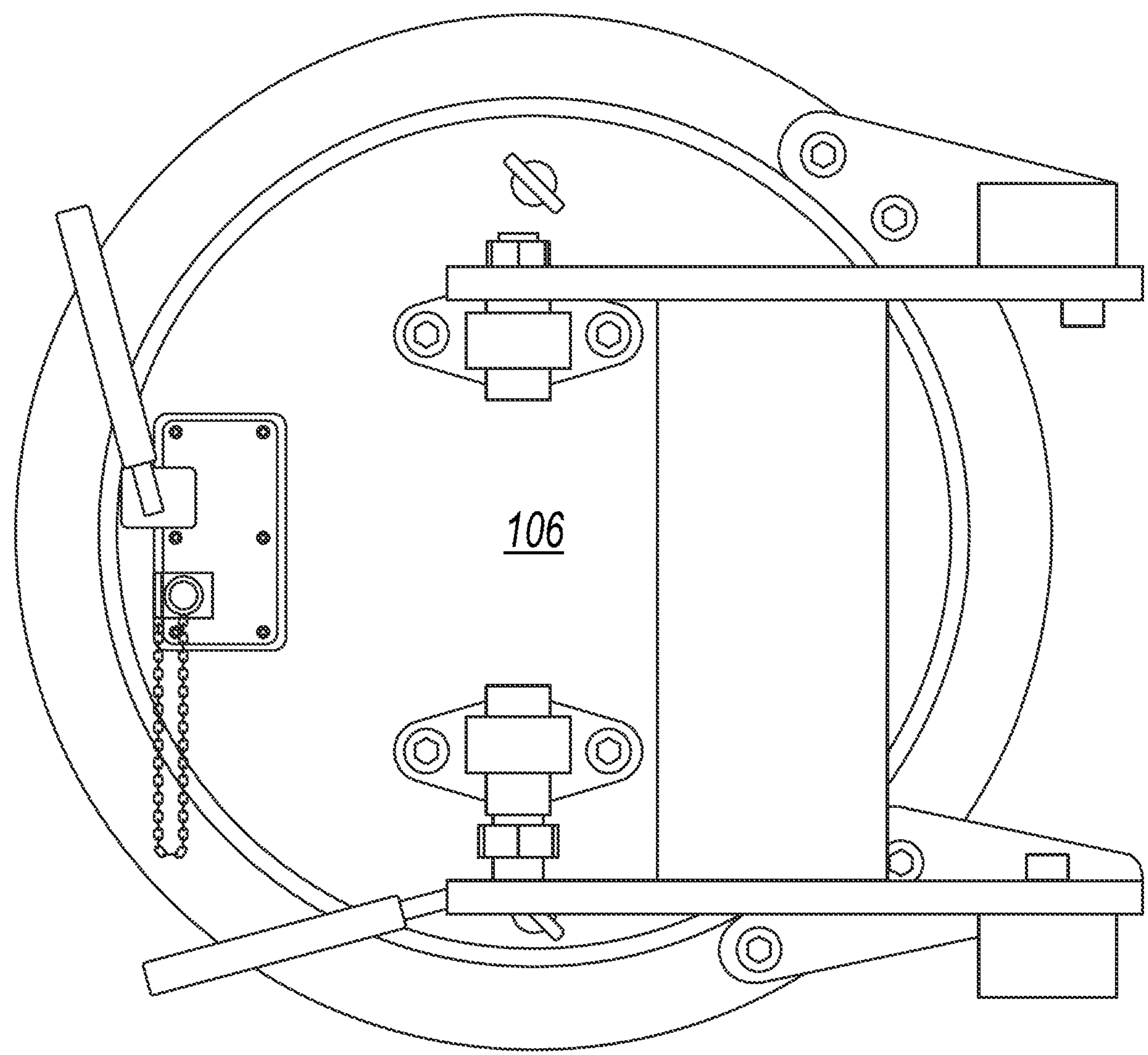
FIG. 2 is a perspective view of a pig launcher door in a closed position.
Figure 3:
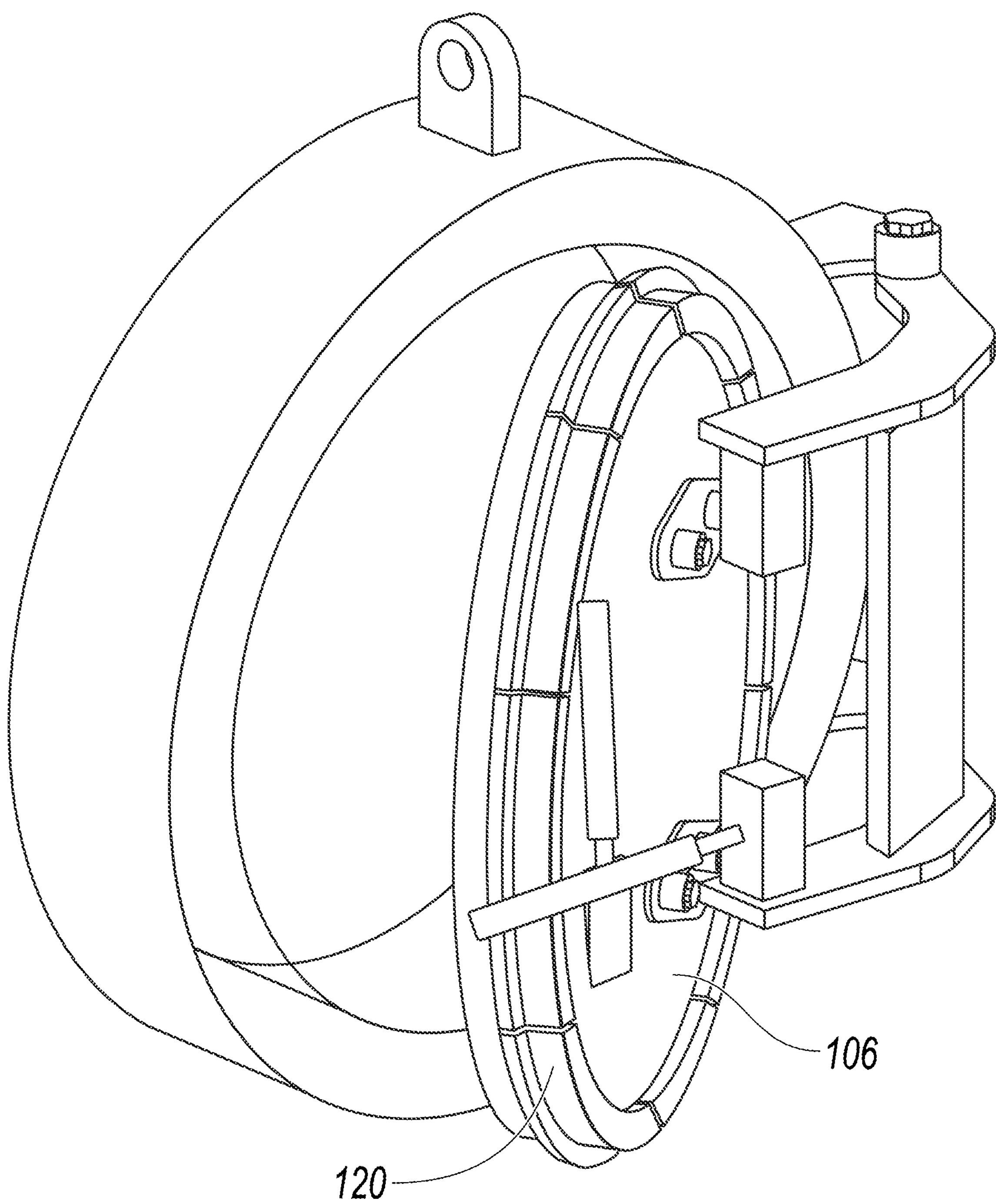
FIG. 3 is a perspective view of a pig launcher door in an open position.

FIG. 1 is a perspective view of an example pig launcher 100. The pig launcher 100 includes an access way and a door 106 that regulates access to the access way. The pig launcher 100 is fluidically connected to a pipeline by a mainline valve 90, and various other drain and vent valves arranged to pressurize and depressurize the pig launcher 100. FIG. 2 is a perspective view of a pig launcher door 106 in a closed position. FIG. 3 is a perspective view of a pig launcher door 106 in an open position. The pig launcher door includes latches 120 to secure the door 106 into the closed position.

Figure 4A:
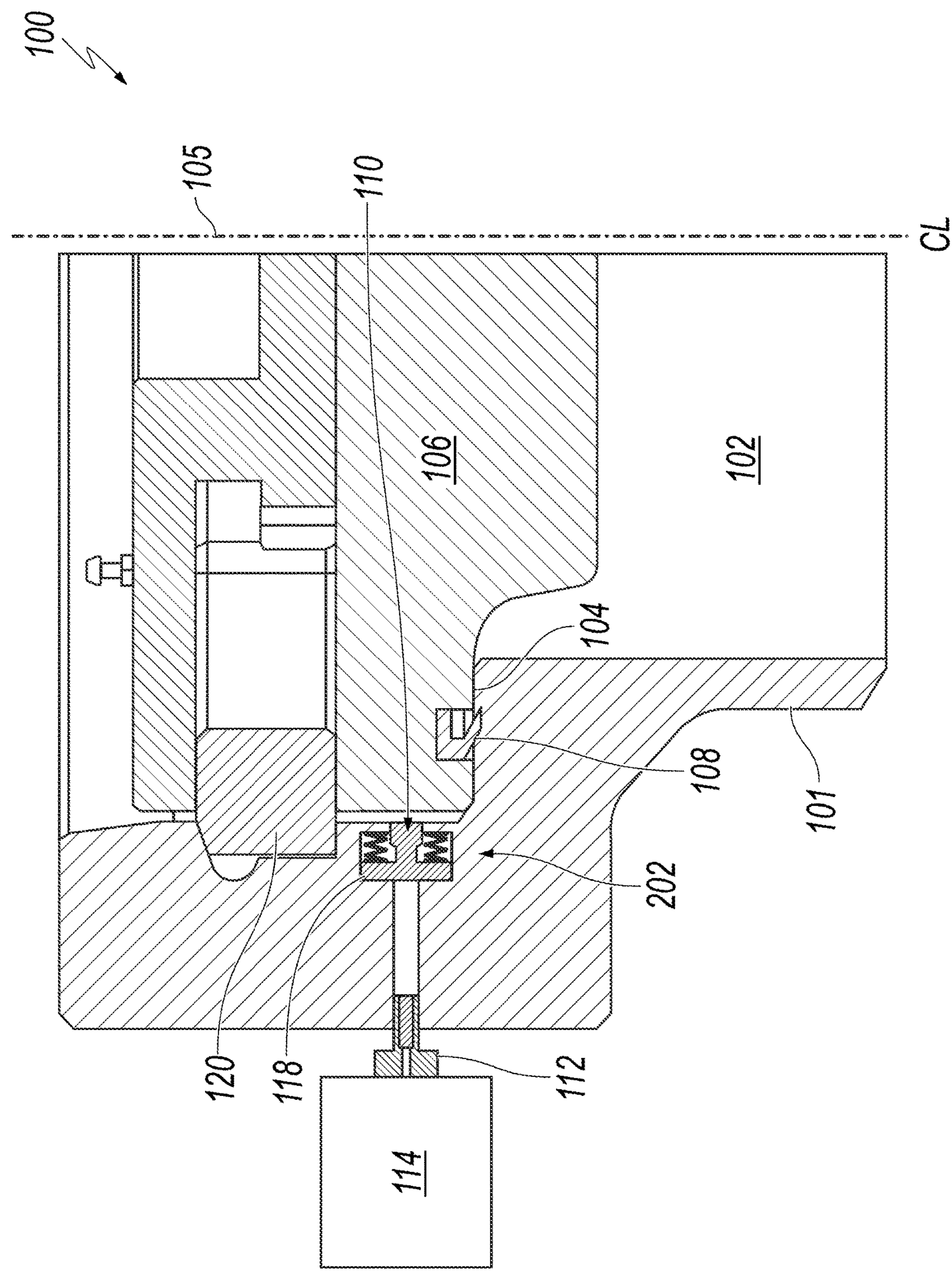
FIG. 4A is a quarter side cross-sectional view of an example door seal system.

FIG. 4A is a quarter, side cross-sectional view of an example door seal system 100. The door seal system 100 includes an access way to enter a pressure vessel 101, such as a pig launcher or pig trap (receiver). The pressure vessel defines an opening 102 that include a shoulder 104 around a periphery of the opening 102. Such a shoulder acts as a seat for a door 106 to the access way. The shoulder 104 itself is defines a profile parallel to the door such that the shoulder 104 can receive the door. The shoulder extends towards a centerline 105 of the pressure vessel 101. As illustrated, the shoulder is perpendicular to the walls of the pressure vessel 101; however, other configurations are possible so long as the door is capable of sealingly seating against the shoulder

104. The door 106 is actuable between an open and a closed position. That is, the door 106 can be opened and closed to regulate access to the opening 102. In the closed position, the door 106 compresses against the shoulder. Such compression can be imposed by the latch 120. In some implementations, the latch 120 includes a ramped profile 122 that creates a compressive force when engaged. In general, the door 106 is seated on the shoulder when latched in the closed position (illustrated in FIG. 4A).

A first seal 108 is located between the door 106 and the shoulder 104. The first seal is intended to retain pressure and fluid within the pressure vessel. In some implementations, the first seal 108 is attached to the door 106. In some implementations, the first seal 108 is attached to the shoulder 104. The first seal 101 can be attached through a variety of attachment mechanisms, such as an interference fit, a compression fit, adhesive or a fastener. Regardless of where or how the first seal 108 is attached, the first seal abuts, or touches, an interior side of the door and the shoulder when the door is in the closed position. In some implementations, the first seal 108 is compressed between the door and the shoulder 104 when the door 106 is in the closed position. That is, in such a situation, the first seal 108 can be crushed or otherwise deformed to ensure a proper seal. Examples of such seals include standard O-rings with a round, square, or chevron profile. Other profiles can be used without departing from this disclosure, such as a U-shaped or V-shaped profile. The first seal 108 itself retains pressurized fluid within the pressure vessel 101. Such fluids can include liquids, gasses, water, hydrocarbons, or any other pressurized fluid. The fluid itself can be pressurized from a variety of pressure sources, for example, pipeline pressure.

A second, active seal 110 surrounds a periphery of the opening 102 and is illustrated in a disengaged position. The second, active seal 110 is actuable between an engaged position and a disengaged position regardless of a position of the door 106. That is, the second seal can be retracted or extended to abut, or touch, the periphery of the door perpendicular to the first seal 108; however, configurations where the second, active seal can be actuated independent of the door position are within the scope of this disclosure. For example, in some implementations, an interlock can prevent the second, active seal 110 from engaging unless the door 106 is in the close position. In some implementations, the interlock can be bypassed (or not be present) such that the second, active seal can be actuated regardless of the door position, for example, during testing operations. In some implementations, the pressure vessel 101 further defines a recess 202 that retains the second, active seal 110 when the second, active seal 110 is in the disengaged position. That is, when the second, active seal 110 is not in use, the second, active seal 110 is retracted and protected from impact by the recess 202 formed within the pressure vessel 101. When the second, active seal 110 is engaged and touching the periphery of the door 106, the second, active seal 110 acts as a secondary, back-up, or emergency seal to retain pressure and fluid within the pressure vessel 101, particularly in the event that the first seal 108 fails or leaks pressurized fluid past the first seal 108.

Figure 4B:
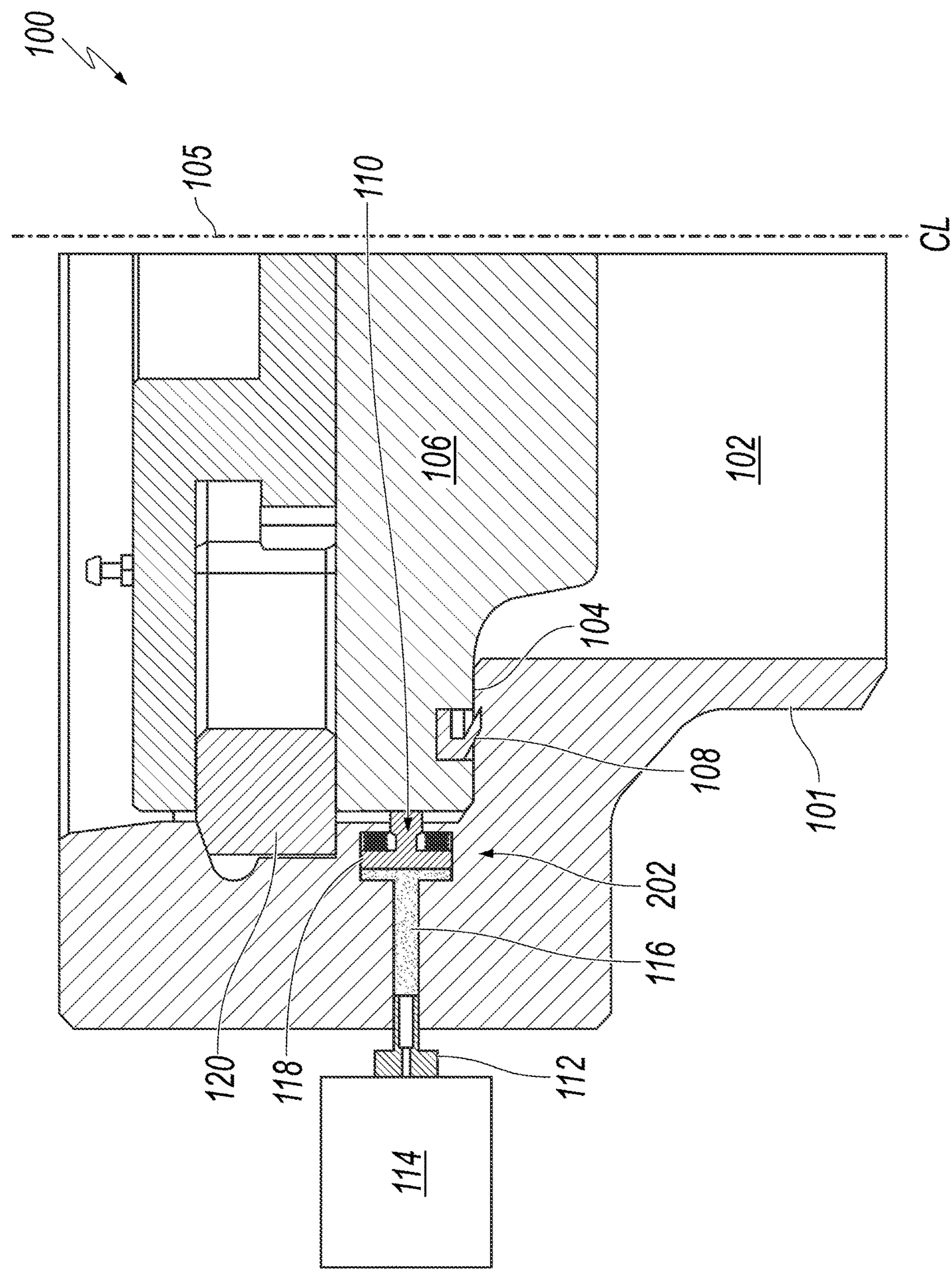
FIG. 4B is a quarter side cross-sectional view of an example door seal system with a secondary seal in the engaged position.

In some implementations, a hydraulic or pneumatic connection 112 is included within the door seal system 100. The hydraulic or pneumatic connection 112 allows a pneumatic or hydraulic pressure source 114 to be fluidically connected to the second, active seal 110. In some implementations, the pressure source 114 is used to actuate the second, active seal 110. FIG. 4B is a side cross-sectional view of the example door seal system 100 with the second, active seal 110 in the engaged position. In some implementations, the second, active seal 110 includes a flexible membrane configured to be filled by the pneumatic or hydraulic fluid 116 as shown in FIG. 4B. The pneumatic or hydraulic fluid actuates the second, active seal 110 between an engaged position (FIG. 4B) and disengaged position (FIG. 4A). The engaged position is when the flexible membrane 118 is filled with the pneumatic or hydraulic fluid. The disengaged position is when fluid is removed from the flexible membrane 118.

Figure 5A:
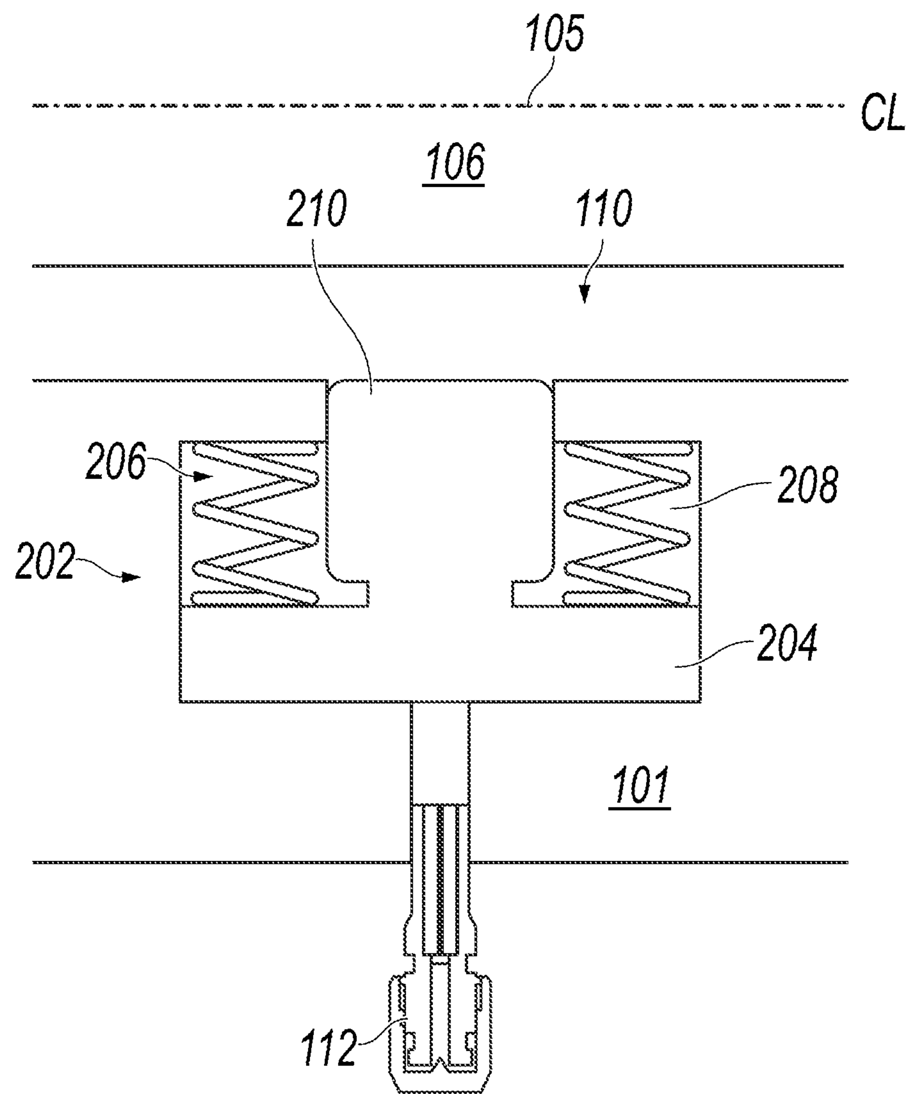
FIG. 5A is a side cross-sectional view of the example secondary seal.

FIG. 5A is a quarter, side cross-sectional view of the example second, active seal 110. The second, active seal 110 is housed in a recess 202 defined by a wall of the pressure vessel. The recess 202 encircles the periphery of the opening 102 (FIGS. 1-2). As such, the recess 202 (and the second, active seal 110 housed within the recess) encircle the periphery of the door 106 when the door is in the closed position. The recess 202 houses, retains, and protects the second, active seal 110 when the second, active seal 110 is in the disengaged position.

The second, active seal 110 itself includes a cross-sectional profile with a base 204 abutting the bias 206 and the hydraulic or pneumatic fluid (when engaged). A contact 210 extends from the base 204 towards a periphery of the opening 102.

Figure 5B:
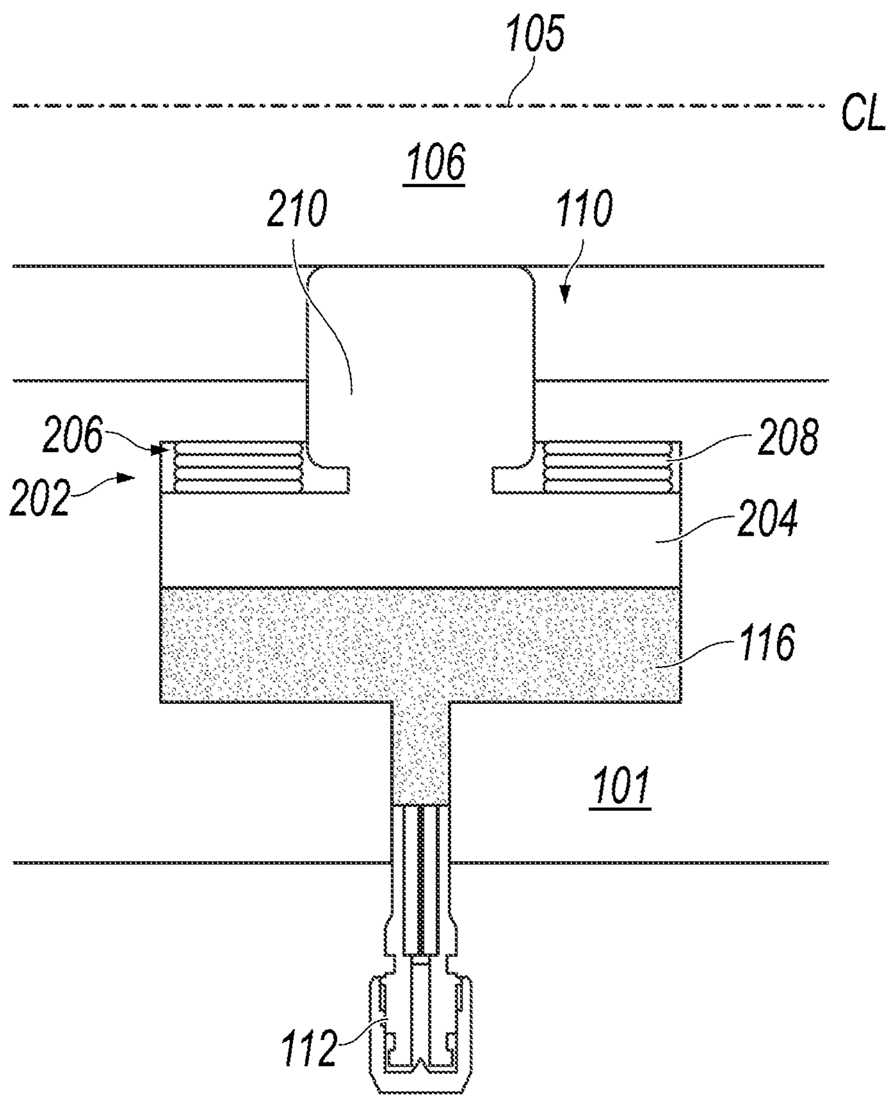
FIG. 5B is a side cross-sectional view of the example secondary seal in the engaged position.

The bias 206 is arranged to maintain the second, active seal 110 in a disengaged position. In some implementations, the bias 206 can include a metal spring 208 in compression. In such an implementation, the bias 206 presses the second, active seal 110 outward, further into the recess 202 and away from the opening or door 106. While primarily illustrated and described as including one or more compression springs, the bias can include other arrangements without departing from this disclosure. For example, the bias can include a spring in tension on a wetted side of the base (that is, the side of the base exposed to the hydraulic or pneumatic fluid). Alternatively or in addition, the second, active seal 110 itself can act as its own bias based upon the spring constant of the seal material. In operation, the hydraulic or pneumatic fluid is configured to overcome the bias 206 to actuate the second, active seal 110 from the disengaged position to the engaged position. FIG. 5B illustrates such a situation as FIG. 5B is a side cross-sectional view of the example second, active seal 110 in the engaged position. As can be seen in FIG. 5B, the hydraulic or pneumatic fluid 116 has sufficient pressure from the hydraulic or pneumatic pressure source 114 to overcome the bias 206 (a compression spring as illustrated) and actuate the seal into the engaged position such that the contact 210 touches the periphery of the door 106. Other cross-sectional shapes for the second, active seal 110 can be used without departing from this disclosure.

Figure 6:
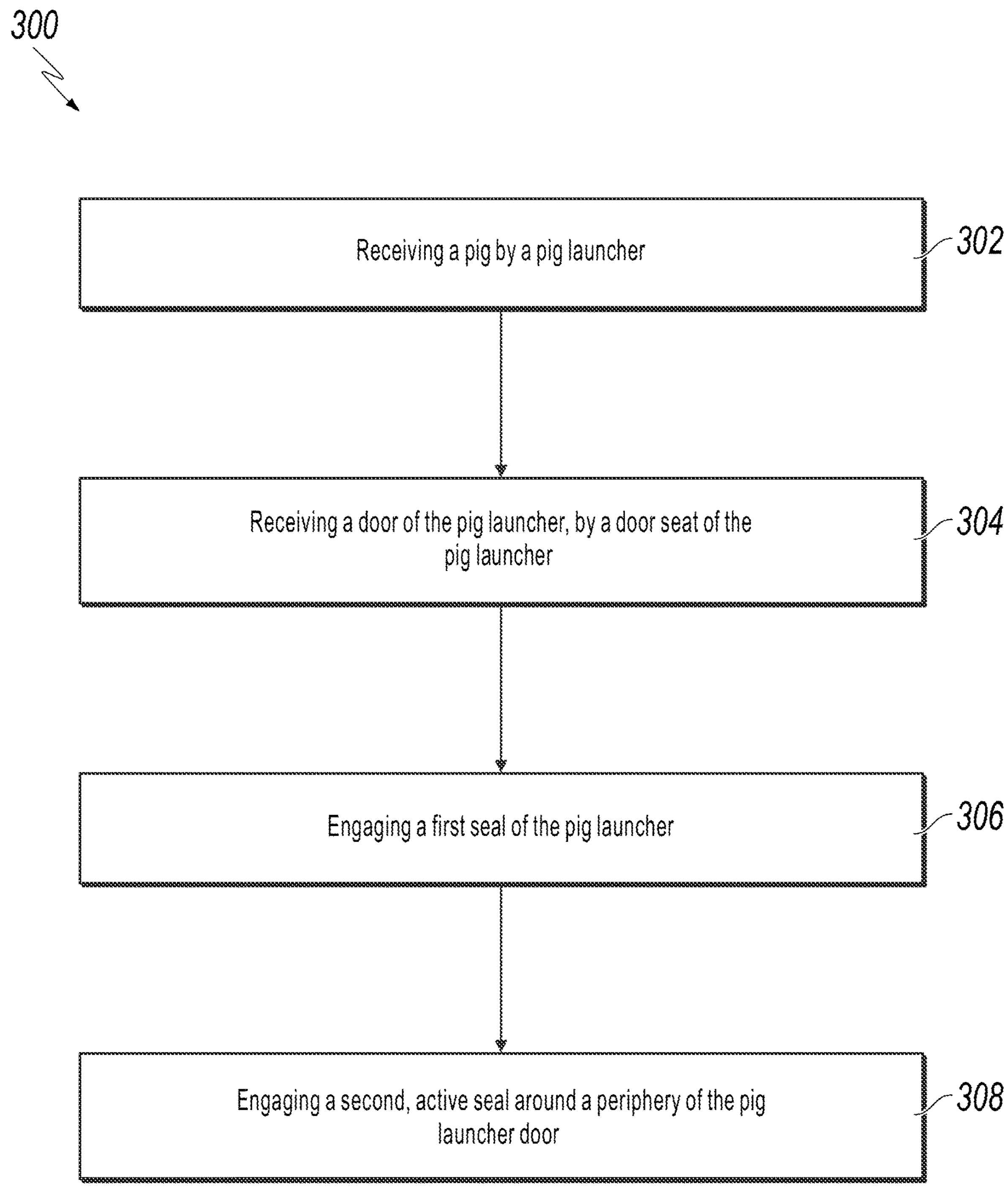
FIG. 6 is a flowchart of an example method that can be used with aspects of this disclosure.

FIG. 6 is a flowchart 300 of an example method that can be used with aspects of this disclosure. At 302, a pig is received by a pig launcher. At 304, a door of the pig launcher is received by a door seat of the pig launcher. The door is received in a closed position. At 306, a first seal of the pig launcher is engaged to retain pressure and fluid within the pig launcher responsive to receiving the closed door. The closed door touches, abuts, or compresses the first seal 108. That is, in some implementations, engaging the first seal includes compressing the first seal against a side of the door that abuts the pig launcher. Such a portion of the pig launcher can include a shoulder for the door to seat against. At 308 a second, active seal is engaged around a periphery of the pig launcher door to retain pressure and fluid within the pig launcher. The second seal is engaged responsive to a pressure signal, such as from a pneumatic or hydraulic pressure source. That is, engaging the second, active seal 110 includes applying hydraulic or pneumatic fluid to the second, active seal. The application of hydraulic or pneumatic fluid to the active seal causes the seal to abut a periphery of the door.

In some instances, fluid flows from the pig launcher past the first seal 108, and the fluid flow from the pig launcher is ceased, or stopped, by the second, active seal 110. Such circumstances can occur when the first seal 108 fails due to wear, over pressure, or any other failure event. In such an event, the second, active seal 110 prevents fluids or pressure from leaking to an outside environment.

After pigging operations are completed, the second, active seal 110 is disengaged. Disengaging includes biasing the second, active seal away from the door and releasing pressurized fluid from the second, active seal 110. The door of the pig launcher is then released by the pig launcher. For example, the door is unseated from the shoulder and the first seal 108.

While this disclosure contains many specific implementation details, these should not be construed as limitations on the scope of any inventions or of what may be claimed, but rather as descriptions of features specific to particular implementations. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described components and systems can generally be integrated together in a single product or packaged into multiple products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. An access way to a pressure vessel, the access way comprising:

- a pressure vessel defining an opening with a shoulder around a periphery of the opening;
- a door actuable between an open and a closed position, the door configured to regulate access to the opening, the door configured to compress against the shoulder when in the closed position;
- a first seal between the door and the shoulder, the first seal being attached to the door or the shoulder, the first seal touching an interior side of the door and the shoulder when the door is in the closed position, the first seal configured to seal fluid within the pressure vessel; and
- a second, active seal surrounding a periphery of the opening, the seal being actuable between an engaged position and a disengaged position regardless of a position of the door, the second, active seal touching the periphery of the door, perpendicular to the first seal, when in the engaged position and the door is in the closed position, the second, active seal configured to seal fluid within the pressure vessel.

2. The access way of claim 1, further comprising a hydraulic or pneumatic connection configured to fluidically connect the second, active seal and a pneumatic or hydraulic pressure source, the pressure source configured to actuate the second, active seal.

3. The access way of claim 2, wherein the second, active seal comprises a flexible membrane configured to be filled by the pneumatic or hydraulic fluid, the pneumatic or hydraulic fluid actuating the second, active seal between an engaged and disengaged position, the engaged position being when the flexible membrane is filled with the pneumatic or hydraulic fluid, the disengaged position being when fluid is removed from flexible membrane.

4. The access of claim 2, wherein the second, active seal comprises a bias arranged to maintain the second, active seal in a disengaged position, the hydraulic or pneumatic fluid configured to overcome the bias to actuate the second, active seal from the disengaged position to the engaged position.

5. The access way of claim 4, wherein the bias comprises a metal spring.

6. The access way of claim 1, wherein the pressure vessel defines a recess within the pressure vessel, the recess encircling the periphery of the door when the door is in the closed position, the recess retaining the second, active seal when the second, active seal is in the disengaged position.

7. The access way of claim 4, wherein the second, active seal comprises a cross-sectional profile comprising:

- a base abutting the bias; and
- a contact extending from the base towards a periphery of the opening.

8. A method comprising:

- receiving a pig by a pig launcher;
- receiving a door of the pig launcher, by a door seat of the pig launcher, the door being received in a closed position;
- engaging a first seal of the pig launcher, to retain pressure within the pig launcher, responsive to receiving the closed door, the closed door touching the first seal; and
- engaging a second, active seal around a periphery of the pig launcher door, to retain pressure within the pig launcher, responsive to a pressure signal.

9. The method of claim 8, wherein engaging the first seal comprises compressing the first seal against a side of the door that abuts the pig launcher.

10. The method of claim 8, wherein engaging the second, active seal comprises applying hydraulic or pneumatic fluid to the second, active seal.

11. The method of claim 8, wherein engaging the second, active seal comprises abutting the second, active seal around a periphery of the door.

12. The method of claim 8, further comprising:

- flowing fluid from the pig launcher past the first seal; and
- ceasing fluid flow from the pig launcher by the second, active seal.

13. The method of claim 8, further comprising:
disengaging the second, active seal; and
releasing the door by the pig launcher.

14. The method of claim 13, wherein disengaging comprises:
biasing the second, active seal away from the door; and
releasing pressurized fluid from the second, active seal.

15. A pig launcher comprising:
a pressure retaining wall defining a cavity, an inlet to the cavity, and an outlet to the cavity;
a door actuable between an open and a closed position, the door arranged to define a portion of the cavity when in the closed position, the door configured to seat against the inlet to the cavity, the door configured to regulate access to the cavity;
a first seal between the door and the pressure retaining wall, the first seal being parallel to the door when the door is in the closed position, the seal touching the door when the door is in the close position, the first seal configured to seal fluid within the pig launcher; and
a second, active seal surrounding a periphery of the inlet to the cavity, the second, active seal being actuable between an engaged position and a disengaged position, the second, active seal touching the periphery of the door when in the engaged position and the door is in the closed position, the second, active seal configured to seal fluid within the pig launcher.

16. The pig-launcher of claim 15, a hydraulic or pneumatic pressure source configured to actuate the second, active seal.

17. The pig-launcher of claim 16, wherein the second, active seal comprises a flexible membrane configured to be filled by a pneumatic or hydraulic fluid supplied by the hydraulic or pneumatic pressure source, the pneumatic or hydraulic fluid actuating the second, active seal between an engaged and disengaged position, the engaged position being when the flexible membrane is filled with the pneumatic or hydraulic fluid, the disengaged position being when fluid is removed from flexible membrane.

18. The pig-launcher of claim 15, wherein the second, active seal comprises a bias arranged to maintain the second, active seal in a disengaged position.

19. The pig-launcher of claim 18, wherein the bias comprises a metal spring.

20. The pig-launcher of claim 15, wherein the pressure retaining wall further defines a recess that retains the second, active seal when in the second, active seal is in the disengaged position.

* * * * *

UNITED STATES PATENT AND TRADEMARK OFFICE

CERTIFICATE OF CORRECTION

PATENT NO. : 11,976,771 B2
APPLICATION NO. : 17/493925
DATED : May 7, 2024
INVENTOR(S) : Mousa R. Al-Harbi, Khaled A. Al-Odaib and Essam Ahmed Al-Arfaj It is certified that error appears in the above-identified patent and that said Letters Patent is hereby corrected as shown below:

In the Claims

In Column 8, Line 26, Claim 4, please replace “access” with -- access way --.

Signed and Sealed this
Fifth Day of November, 2024

Katherine Kelly Vidal

Katherine Kelly Vidal
*Director of the United States Patent and Trademark Office*